United States Patent
Lofamia et al.

(10) Patent No.: US 10,642,769 B2
(45) Date of Patent: May 5, 2020

(54) SERIAL PERIPHERAL INTERFACE DAISY CHAIN MODE SYSTEM AND APPARATUS

(71) Applicant: ANALOG DEVICES GLOBAL UNLIMITED COMPANY, Hamilton (BM)

(72) Inventors: Wes Vernon Lofamia, Metro Manila (PH); Jofrey Santillan, Iligan (PH); David Aherne, Limerick (IE)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 15 days.

(21) Appl. No.: 15/468,781

(22) Filed: Mar. 24, 2017

(65) Prior Publication Data

US 2018/0276157 A1  Sep. 27, 2018

(51) Int. Cl.
*G06F 13/00* (2006.01)
*G06F 13/364* (2006.01)
*G06F 13/42* (2006.01)
*G06F 13/40* (2006.01)

(52) U.S. Cl.
CPC .......... *G06F 13/364* (2013.01); *G06F 13/404* (2013.01); *G06F 13/4282* (2013.01)

(58) Field of Classification Search
CPC ........ G06F 13/364; G06F 1/08; G06F 13/404; G06F 13/4282

USPC ......................................................... 710/110
See application file for complete search history.

(56) References Cited

U.S. PATENT DOCUMENTS

| | | | |
|---|---|---|---|
| 8,384,427 B1 | 2/2013 | Tang et al. | |
| 8,700,845 B1* | 4/2014 | Bowers | G11C 7/1003 711/110 |
| 2004/0093450 A1* | 5/2004 | Andreas | G06F 13/4291 710/110 |
| 2014/0115222 A1 | 4/2014 | DeCesaris et al. | |
| 2016/0098371 A1 | 4/2016 | Murtaza et al. | |
| 2018/0173665 A1* | 6/2018 | Mishra | G06F 13/364 |

* cited by examiner

*Primary Examiner* — Chun Kuan Lee
(74) *Attorney, Agent, or Firm* — Patent Capital Group

(57) ABSTRACT

SPI frame for simultaneously entering 8 bit daisy-chain mode from 16 bit register addressable mode. Some products that implement SPI may be connected in a daisy chain configuration, the first slave output being connected to the second slave input, etc. The SPI port of each slave is designed to send out during the second group of clock pulses an exact copy of the data it received during the first group of clock pulses. The whole chain acts as a communication shift register; daisy chaining is often done with shift registers to provide a bank of inputs or outputs through SPI. Large latency occurs during the entry into daisy-chain mode which increases as a function of the number of linked SPI devices. A means for simultaneously instructing all connected devices to enter/enable daisy-chain mode is disclosed.

24 Claims, 10 Drawing Sheets

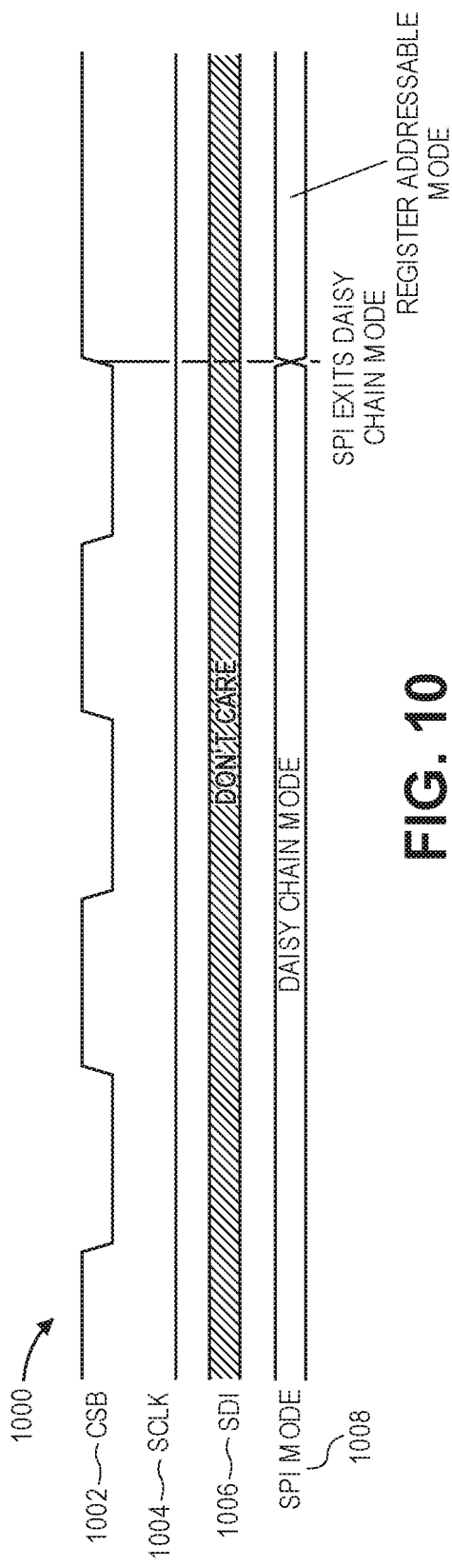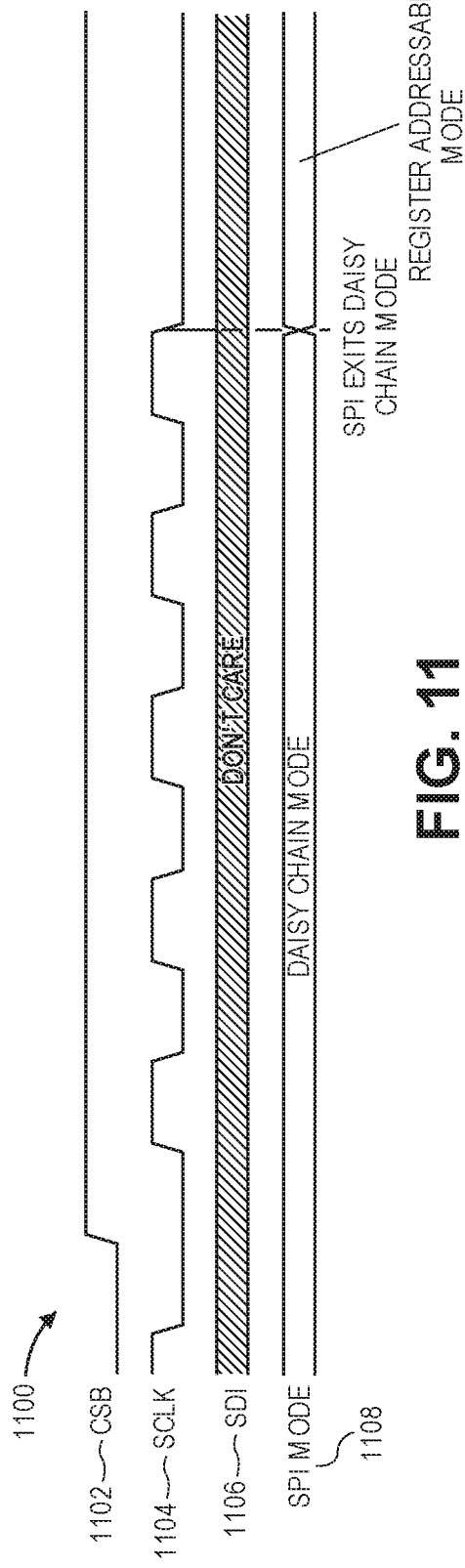

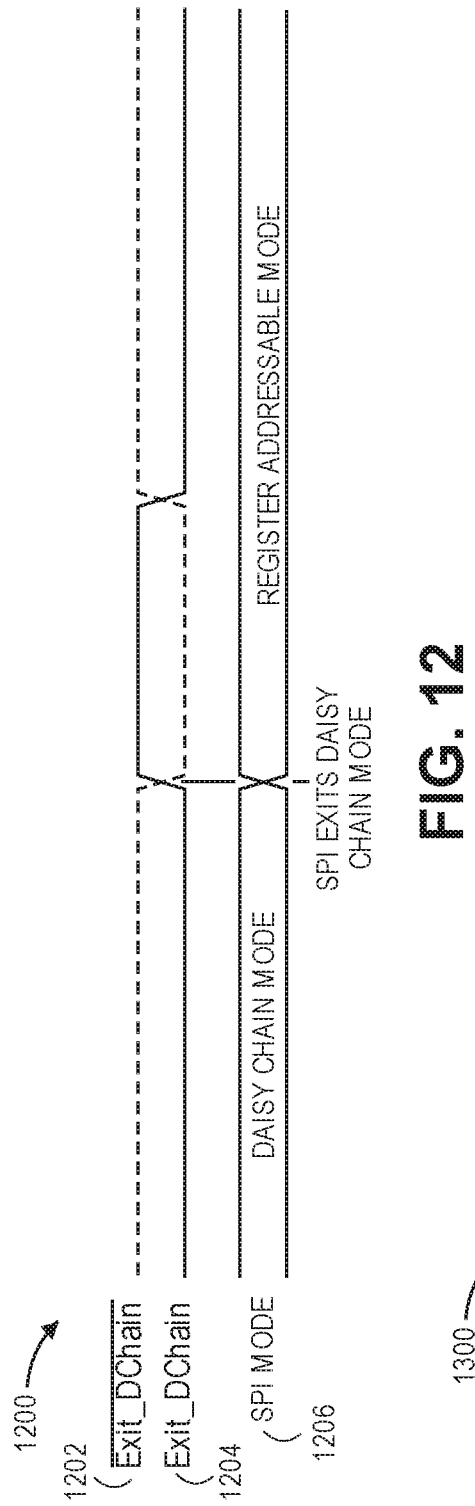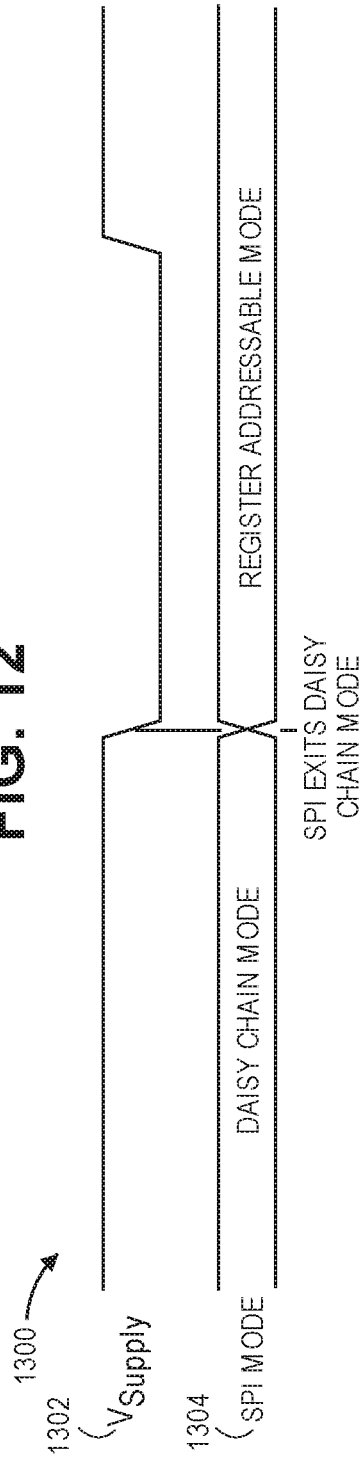

SERIAL PERIPHERAL INTERFACE DAISY CHAIN MODE SYSTEM AND APPARATUS

FIELD OF THE DISCLOSURE

The present disclosure relates to synchronous serial communication interfaces used for short distance communication, primarily in embedded systems. More specifically, this disclosure describes apparatus and techniques relating to serial peripheral interface (SPI) busses and changing modes thereof.

BACKGROUND

In telecommunication and data transmission, serial communication is the process of sending data one bit at a time, sequentially, over a communication channel or computer bus. This is in contrast to parallel communication, where several bits are sent as a whole, on a link with several parallel channels. The communication links across which modern devices talk to one another may be either serial or parallel.

A parallel link transmits several streams of data simultaneously along multiple channels (e.g., wires, printed circuit tracks, or optical fibers); whereas, a serial link transmits only a single stream of data. Although a serial link may seem inferior to a parallel one, since it can transmit less data per clock cycle, it is often the case that serial links can be clocked considerably faster than parallel links in order to achieve a higher data rate.

Several factors allow serial to be clocked at a higher rate. For instance, serial connection requires fewer interconnecting cables (e.g., wires/fibers) and hence occupies less space. The extra space allows for better isolation of the channel from its surroundings. Additionally crosstalk is less of an issue because there are fewer conductors in proximity. In many cases, serial is cheaper to implement than parallel. Many integrated circuits (ICs) have serial interfaces, as opposed to parallel ones, so that they have fewer pins and are therefore less expensive.

Common serial ports, with transmit (TX) and receive (RX) lines, are asynchronous (not synchronous) because there is no control over when data is sent or any guarantee that both sides are running at precisely the same rate. Asynchronous serial connections frequently add extra start and stop bits to each byte help the receiver sync up to data as it arrives. Both sides must also agree on the transmission speed in advance. Slight differences in the transmission rate aren't a problem because the receiver re-syncs at the start of each byte.

A synchronous data bus uses separate lines for data and a clock that keeps both sides in perfect sync. The clock is an oscillating signal that tells the receiver exactly when to sample the bits on the data line. This could be the rising (low to high) or falling (high to low) edge of the clock signal. When the receiver detects that edge, it will immediately look at the data line to read the next bit. Because the clock is sent along with the data, specifying the speed isn't important, although devices will have a top speed at which they can operate.

Serial Peripheral Interface (SPI) is an interface bus commonly used to send data between microcontrollers and small peripherals such as shift registers, sensors, and SD cards. It uses separate clock and data lines, along with a select line to choose the device you wish to talk to. The Serial Peripheral Interface bus (SPI) is a synchronous serial communication interface specification used for short distance communication, primarily in embedded systems.

SPI devices communicate in full duplex mode using a master-slave architecture with a single master. In contrast to devices employing simplex communication whereby data is only pushed in one direction, a full-duplex (FDX) system, or sometimes called double-duplex, allows communication in both directions, and, unlike half-duplex, allows this to happen simultaneously. As an example, land-line telephone networks are full-duplex, since they allow both callers to speak and be heard at the same time. Modern cell phones are also full-duplex.

Master/slave architecture is a model of communication where one device or process has unidirectional control over one or more other devices. In some systems a master is selected from a group of eligible devices, with the other devices acting in the role of slaves. The master device originates the frame for reading and writing. Multiple slave devices are supported through selection with individual slave select (SS) lines.

More specifically, devices communicate using a master/slave relationship, in which the master initiates the data frame, as follows. When the master generates a clock and selects a slave device, data may be transferred in either or both directions simultaneously. In fact, as far as SPI is concerned, data are always transferred in both directions. It is up to the master and slave devices to know whether a received byte is meaningful or not. So a device must discard the received byte in a "transmit only" frame or generate a dummy byte for a "receive only" frame.

Sometimes SPI is called a four-wire serial bus, contrasting with three-, two-, and one-wire serial buses. The SPI may be accurately described as a synchronous serial interface, but it is different from the Synchronous Serial Interface (SSI) protocol, which is also a four-wire synchronous serial communication protocol. But SSI Protocol employs differential signaling and provides only a single simplex communication channel.

SPI devices are useful because the receiving hardware can be implemented as a simple shift register. This is a much simpler (and cheaper) piece of hardware than the full-up UART (Universal Asynchronous Receiver/Transmitter) that asynchronous serial requires.

A more recent advance is the use of single master/multiple slave devices configured into a daisy-chain configuration. However, the inventors of the present disclosure have recognized the need for the greater versatility associated with SPI mode changing at the device and/or register abstraction levels.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY OF THE DISCLOSURE

SPI frame for simultaneously entering 8 bit daisy-chain mode from 16 bit register addressable mode. Some products that implement SPI may be connected in a daisy chain configuration, the first slave output being connected to the second slave input, etc. The SPI port of each slave is designed to send out during the second group of clock pulses an exact copy of the data it received during the first group of clock pulses. The whole chain acts as a communication shift register; daisy chaining is often done with shift registers to provide a bank of inputs or outputs through SPI. Large latency occurs during the entry into daisy-chain mode which increases as a function of the number of linked SPI devices. A means for simultaneously instructing all connected devices to enter/enable daisy-chain mode is disclosed. The inventors have recognized a need to quickly and efficiently change modes in an SPI daisy chain configuration.

According to one aspect, the present disclosure is an apparatus for entering daisy-chain mode in an SPI device comprising an input to receive serial data, a clock pin to receive a temporal signal, a select pin whereby when asserted, the SPI device receives data over the input, and a serial output whose default instruction is a signal to enable daisy chain mode.

According to another aspect, the present disclosure is a system for entering daisy-chain mode comprising an SPI master device and a plurality of SPI slave devices concatenated in a daisy chain configuration. According to one or more aspects, each SPI slave device comprises an input to receive serial data, a clock pin to receive a temporal signal, a select pin whereby when asserted, the SPI slave device receives data over the input and, a serial output whose default instruction is a signal to enable daisy chain mode.

According to another aspect, the present disclosure is an apparatus for entering daisy-chain mode in an SPI device comprising a means for receiving serial data, a means for receiving a clock signal, a means for receiving a select signal, whereby when asserted, the SPI device receives data over the input and, a means for transmitting serial, wherein the default transmission is a signal to enable daisy chain mode.

The drawings show exemplary SPI circuits and configurations. Variations of these circuits, for example, changing the positions of, adding, or removing certain elements from the circuits are not beyond the scope of the present invention. The illustrated SPI devices and configurations are intended to be complementary to the support found in the detailed description.

BRIEF DESCRIPTION OF THE DRAWINGS

For a fuller understanding of the nature and advantages of the present invention, reference is made to the following detailed description of preferred embodiments and in connection with the accompanying drawings, in which:

FIG. 10 illustrates an exemplary pattern of SCLK and pulsing CSB to exit daisy chain mode, in accordance with some embodiments of the disclosure provided herein;

FIG. 11 illustrates an exemplary pattern of CSB and pulsing SCLK to exit daisy chain mode, in accordance with some embodiments of the disclosure provided herein;

FIG. 12 depicts the exemplary result of exiting daisy chain mode through a dedicated pin, in accordance with some embodiments of the disclosure provided herein;

FIG. 13 depicts the exemplary result of exiting daisy chain mode through power cycling, in accordance with some embodiments of the disclosure provided herein;

DETAILED DESCRIPTION

The present disclosure relates to synchronous serial communication interfaces used for short distance communication, primarily in embedded systems. More specifically, this disclosure describes apparatus and techniques relating to serial peripheral interface (SPI) busses and changing modes thereof.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

In modern computers and peripheral devices, a serial peripheral interface (SPI) is an interface that enables the serial (one bit at a time) exchange of data between two devices, one called a master and the other called a slave. An SPI operates in full duplex mode. This means that data can be transferred in both directions at the same time. The SPI is most often employed in systems for communication between the central processing unit (CPU) and peripheral devices. It is also possible to connect two microprocessors by means of SPI.

Serial interfaces have certain advantages over parallel interfaces. One significant advantage is simpler wiring. In addition, serial interface cables can be longer than parallel interface cables, because there is much less interaction (crosstalk) among the conductors in the cable.

Many types of devices can be controlled by an SPI, including shift registers, memory chips, port expanders, display drivers, data converters, printers, data storage devices, sensors, and microprocessors. Data is transferred serially over a cable, input to a shift register, and transferred within each subsystem by means of parallel processing.

One useful SPI configuration is daisy-chaining. SPI devices are arranged such that the egress of one slave in increased to another slave, acting a like a shift register. However, daisy-chain mode can be entered and configured from another mode called register addressable mode. Daisy-chains may be very long with many slave devices, each acting like a shift register. The inventors of the present disclosure have recognized the need to quickly enter into daisy-chain mode, as the latency to receive a daisy-chain entry mode command is increased for each and every slave device strung together.

Figure 1:
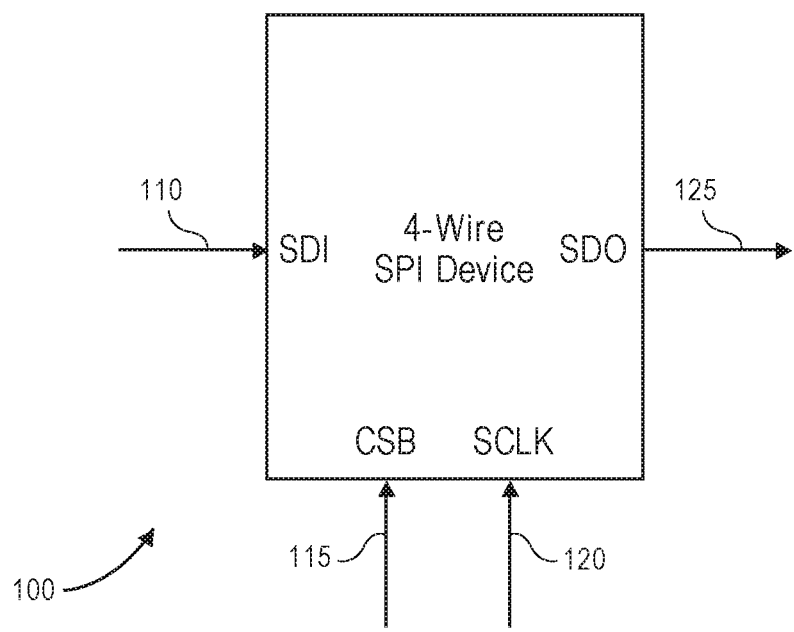
FIG. 1 shows an exemplary 4-wire SPI device, in accordance with some embodiments of the disclosure provided herein.

FIG. 1 shows an exemplary 4-wire SPI slave device 100, in accordance with some embodiments of the disclosure provided herein. The SPI bus interface specifies four signals standards comprising: Serial Clock (SCLK) 120; Master Data Output, Slave Data Input (MOSI); Master Data Input, Slave Data Output (MISO); and Slave/Chip Select (CSB) 115.

The MOSI/MISO convention requires that, on devices using the alternate names, Slave Data In SDI 110 on the master be connected to Slave Data Out SDO 125 on the slave, and vice versa. Slave Select is the same functionality as Slave/Chip Select (CSB) 115 and is used instead of an addressing concept. For clarity, pin names are usually capitalized as in Slave Select, Serial Clock, and Master Output Slave Input.

While the above pin names are the most popular, in the past alternative pin naming conventions were sometimes used, and so SPI port pin names for older IC products may differ from those depicted in these illustrations. For example, Serial Clock: SCLK, SCK; Master Output→Slave Input: MOSI, SIMO, SDI, DI, DIN, SI, MTSR; Master Input←Slave Output: MISO, SOMI, SDO, DO, DOUT, SO, MRST; Serial Data I/O (bidirectional): SDIO, SIO, SDI, SDO; Slave Select: SS, $\overline{SS}$, SSEL, CS, $\overline{CS}$, nSS, /SS, SS #. The operation an SPI bus interface will now be discussed in greater detail.

An SPI bus has one master and one or more slaves. The master can talk to any slave on the bus, but each slave can only talk to the master. In some configurations, each slave on the bus can have its own unique slave select signal. While in others, the slave select signal is shared. The master uses the slave select signals to select which slave it will be talking to. Since SPI also includes a clock signal, both devices don't need to agree on a data rate beforehand. The only requirement is that the clock is lower than the maximum frequency for all devices involved.

Figure 2:
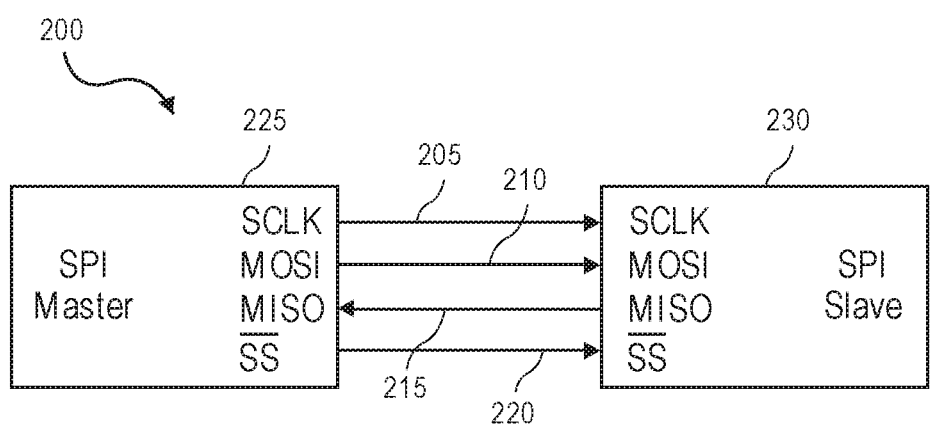
FIG. 2 shows an exemplary master/slave architecture using two 4-wire SPI devices, in accordance with some embodiments of the disclosure provided herein.

FIG. 2 shows an exemplary master/slave architecture 200 using two 4-wire SPI devices, in accordance with some embodiments of the disclosure provided herein. Master/slave architecture 200 comprises a single-slave configuration. SCLK 205 is generated by SPI master 225 and inputted to SPI slave 230. MOSI 210 carries data from SPI master 225 to SPI slave 230. MISO 215 carries data from SPI slave 230 back to SPI master 225. SPI slave device 230 is selected when the SPI master 225 asserts its $\overline{SS}$ signal 220.

When the master 225 of the SPI bus wants to initiate a transfer, it must first pull the $\overline{SS}$ signal 220 low for the slave 230 it wants to communicate with. Once the $\overline{SS}$ signal 220 is low, that slave will be listening on the bus. The master 225 is then free to start sending data over MOSI 210. Any SPI transmission is controlled solely by the master 225. The master 225 generates the clock on SCLK 205 and controls the slave select signal, $\overline{SS}$ 220. This means that the slave 230 has no way of sending data to the master 225 on its own.

Figure 3:
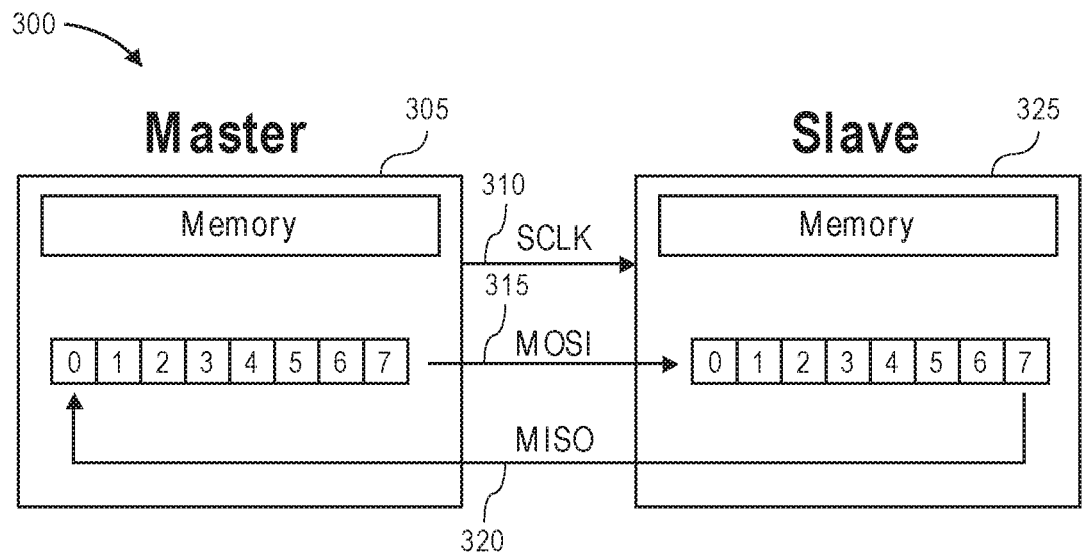
FIG. 3 depicts the operation of an exemplary shift register using a master/slave architecture, in accordance with some embodiments of the disclosure provided herein.

FIG. 3 depicts an exemplary operation utilizing two shift registers to form an inter-chip circular buffer 300, in accordance with some embodiments of the disclosure provided herein. The SPI bus can operate with a single master device 305 and with one or more slave devices 325. If a single slave device 325 is used, the SS pin may be fixed to logic low if the slave 325 permits it. Some slaves require a falling edge of the chip select signal to initiate an action. An example is the an analog to digital converter (ADC), which starts conversion on a high→low transition. With multiple slave devices, an independent SS signal is required from the master 305 for each slave device, which will be discussed later in the disclosure.

Most slave devices have tri-state outputs so their MISO signal 320 becomes high impedance (logically disconnected) when the device is not selected. Devices without tri-state outputs cannot share SPI bus segments with other devices; only one such slave 325 could talk to the master 305.

Turning to FIG. 3, data transmission is performed in the following manner. A typical hardware setup using two shift registers to form an inter-chip circular buffer 300. To begin communication, the bus master 305 configures the clock, using a frequency supported by the slave device 325, typically up to a few MHz. The master 305 then selects the slave device 325 with a low logic level on the select line. It is noted that in the present demonstrative embodiment, the CSB is pinned to a low logic level and not depicted, since this is a single slave configuration.

If a waiting period is required, such as for analog-to-digital conversion, the master must wait for at least that period of time before issuing clock cycles. During each SPI clock cycle on SCLK 310, a full duplex data transmission occurs. The master 305 sends a bit on the MOSI line 315 and the slave 325 reads it, while the slave 325 sends a bit on the MISO line 315 and the master 305 reads it. This sequence is maintained even when only one-directional data transfer is intended.

Transmissions normally involve two shift registers (master 305 and slave 325) of some given word size, such as eight bits, one in the master 305 and one in the slave 325; they are connected in a virtual ring topology. Data is usually shifted out with the most-significant bit first, while shifting a new least-significant bit into the same register. At the same time, data from the counterpart is shifted into the least-significant bit register. After the register bits have been shifted out and in, the master 305 and slave 325 have exchanged register values. If more data needs to be exchanged, the shift registers are reloaded and the process repeats. Transmission may continue for any number of clock cycles over SCLK 310. When complete, the master 305 stops toggling the SCLK 310, and typically deselects the slave 325.

In some embodiments, transmissions often comprise 8-bit words. However, other word sizes are also common, for example, 16-bit words for touchscreen controllers or audio codecs or 12-bit words for many digital-to-analog or analog-to-digital converters. In other embodiments two or more 8-bit words are transmitted. SPI frames will be discussed in greater detail later in the disclosure.

Each SPI transfer is full-duplex, meaning that data is sent from the master 305 to the slave 325 and from the slave 325 to the master 305 at the same time. There is no way for a slave 325 to opt-out of sending data when the master 305 makes a transfer, however, devices will send dummy bytes (usually all 1's or all 0's) when communication should be one way. If the master 305 is reading data in for a slave 325, the slave will know to ignore the data being sent by the master 305.

Devices that use SPI typically will send/receive multiple bytes each time the $\overline{SS}$ signal goes low. This way the $\overline{SS}$ signal acts as a way to frame a transmission. For example, if you had a flash memory that had an SPI bus and you want to read some data, the $\overline{SS}$ signal would go low, the master 305 would send the command to read memory at a certain address, and as long as the master kept $\overline{SS}$ low and toggling SCLK 310 the flash memory would keep sending out data. Once $\overline{SS}$ returned high the flash memory knows to end the read command.

Figure 4:
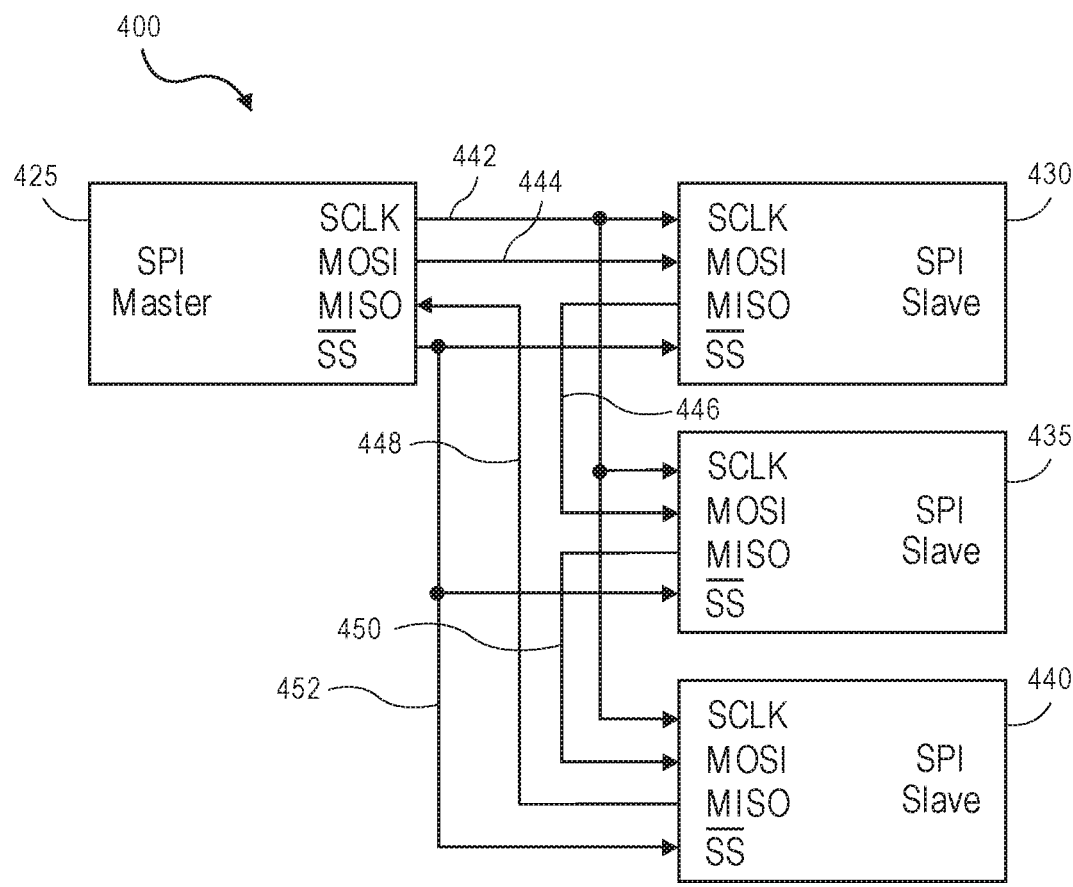
FIG. 4 illustrates an exemplary daisy-chained SPI bus with master and plurality of cooperative slaves, in accordance with some embodiments of the disclosure provided herein.

Since the MISO signal can be connected to multiple devices, each device will only drive the line when its $\overline{SS}$ signal is low. FIG. 4 illustrates an exemplary daisy-chained SPI bus 400 with master 425 and plurality of cooperative slaves 430-440, in accordance with some embodiments of the disclosure provided herein.

Some products that implement SPI may be connected in a daisy chain configuration 400, the first slave 430 MISO output being connected to the second slave 435 MOSI input via trace 446, etc. The SPI port of each slave is designed to send out during the second group of clock pulses an exact copy of the data it received during the first group of clock pulses. The whole chain acts as a communication shift register; daisy chaining is often done with shift registers to provide a bank of inputs or outputs through SPI. Such a feature only requires a single $\overline{SS}$ line 452 from the master 425, rather than a separate $\overline{SS}$ line for each slave.

In the present embodiment, transmission commences from the master 425 during a first group of clock pulses over SCLK 442 after assertion of $\overline{SS}$ line 452. Data is transmitted from the MOSI pin on the master 425 to the MOSI pin on first slave 430. Depending on the SPI device, serial data received by first slave 430 is stored in memory, buffer and/or register. As previously described, output over first slave's 430 MOSI line is typically dummy bytes during the first clock cycle and/or after a hard reset. This importance of which will become apparent later in the disclosure.

Similarly, transmission commences from the first slave 430 during a second group of clock pulses over SCLK 442 after assertion of $\overline{SS}$ line 452. Data is transmitted from the MISO pin on the first slave 430 to the MOSI pin on second slave 435. Following suit, transmission doesn't commence from the second slave 435 until a third group of clock pulses over SCLK 442 after assertion of $\overline{SS}$ line 452. Data is transmitted from the MISO pin on the second slave 435 to the MOSI pin on third slave 440.

In the present exemplary embodiment presented in FIG. 4, the "loop" is completed by transmitting data from the third slave 440 during a fourth group of clock pulses over SCLK 442 after assertion of $\overline{SS}$ line 452. Data is transmitted from the MISO pin on the third slave 440 to the MISO pin on SPI master 425.

Figure 5:
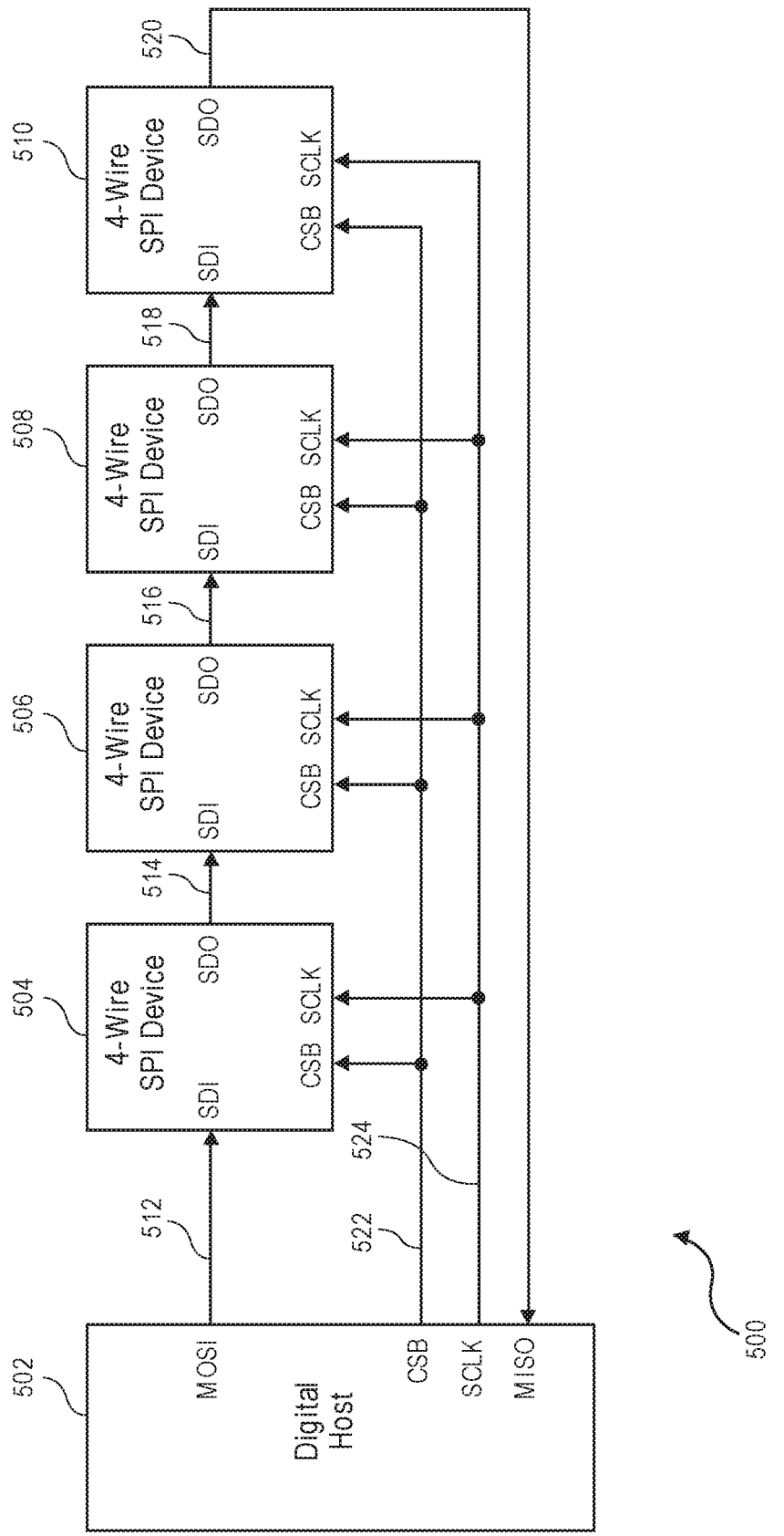
FIG. 5 illustrates an exemplary daisy-chained SPI bus comprising a digital host and plurality of 4-wire SPI devices, in accordance with some embodiments of the disclosure provided herein.

FIG. 5 illustrates an exemplary daisy-chained SPI bus comprising a digital host/master 502 and plurality of 4-wire SPI devices 504, 506, 508, 510 in accordance with some embodiments of the disclosure provided herein. The present disclosure describes a convenient way of entering SPI daisy chain mode from register addressable mode.

In one or more embodiment configured to be used in an SPI daisy-chain, the expected connections of the devices is shown in FIG. 5. Slave/Chip select (CSB) 522 and clock (SCLK) lines 524 are shared by all devices (i.e., digital host 502, plurality of 4-wire SPI devices 504, 506, 508, 510). The master/host's 502 serial output, MOSI 512, is fed to the SDI of the first device 504 on chain. The SDO of the first device 504 is then connected to the SDI of the next device, and so on.

Specifically, the SDO of the first device 504 is then connected to the SDI of the second device 506. The SDO of the second device 506 is then connected to the SDI of the third device 508. The SDO of the third device 508 is then connected to the SDI of the fourth device 510. The SDO of the last device can optionally be connected back to the host's 502 serial in for diagnostic or read-back purposes, in some embodiments.

Figure 6:
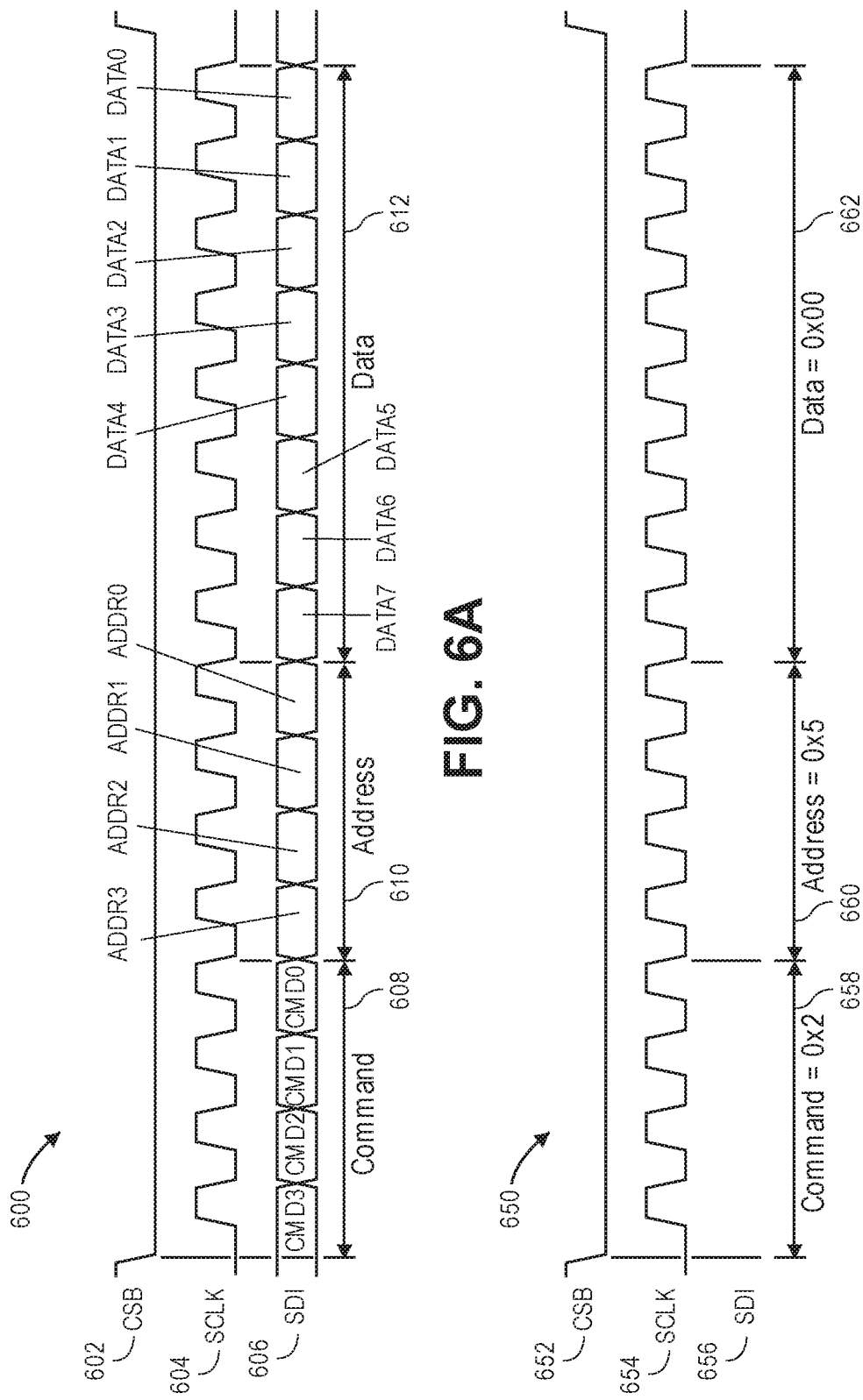
FIG. 6A demonstrates a typical SPI frame during register addressable mode, in accordance with some embodiments of the disclosure provided herein.
FIG. 6B demonstrates an sample SPI command to enter/enable daisy chain mode from register addressable mode, in accordance with some embodiments of the disclosure provided herein.

FIG. 6A demonstrates a typical SPI frame 600 during register addressable mode, in accordance with some embodiments of the disclosure provided herein. When in register addressable mode, an exemplary SPI command 608 is shown in FIG. 6A. It can be seen that when CSB 602 is asserted (low), a typical SPI frame 600 is produced comprising a command 608, an address 610, and data 612.

In the present embodiment, SPI frame 600 comprises two bytes with each bit defined and segmented by SCLK 604. The first nibble of SPI frame 600 comprises a command 608. Individual SPI commands can be read/write and are well known in the art. The second nibble of SPI frame 600 comprises address 610. Address 610 is location of where command 608 is to be applied. Typically this is an SPI register which is used to configure the SPI device but can also be a location in memory. Data 612 is comprised by the last byte of SPI frame 600. Data 612 is a field that either is written to or read from the address 610 depending on command 608.

FIG. 6B demonstrates an sample SPI daisy-chain command frame 650 to enter/enable daisy chain mode from register addressable mode, in accordance with some embodiments of the disclosure provided herein. Entering/Enabling daisy chain mode is achieved by writing to a certain address a defined command-address-data combination.

More specifically, when CSB 652 is asserted (low), SPI daisy-chain command frame 650 is produced, which comprises a command 658, an address 660, and data 662. SPI daisy-chain command frame 650 comprises two bytes with each bit defined and segmented by SCLK 654. The first nibble of SPI daisy-chain command frame 650 comprises command 658. The second nibble of SPI daisy-chain command frame 650 comprises address 660. Address 660 is location of where command 658 is to be applied. Data 662 is comprised by the last byte of SPI daisy-chain command frame 600. In the present embodiment In the present exemplary embodiment, SPI daisy-chain command frame 650 is a unique combination of command 658, address 660 and data 662. That is, command 658=0×2, address 660=0×5 and data 662=0×00, in hexadecimal. Command 658 indicates writing data 662 to register at address 660. However, any combination thereof is not beyond the scope of the present invention. And, not all fields in daisy-chain command frame 650 are necessary.

Figure 7:
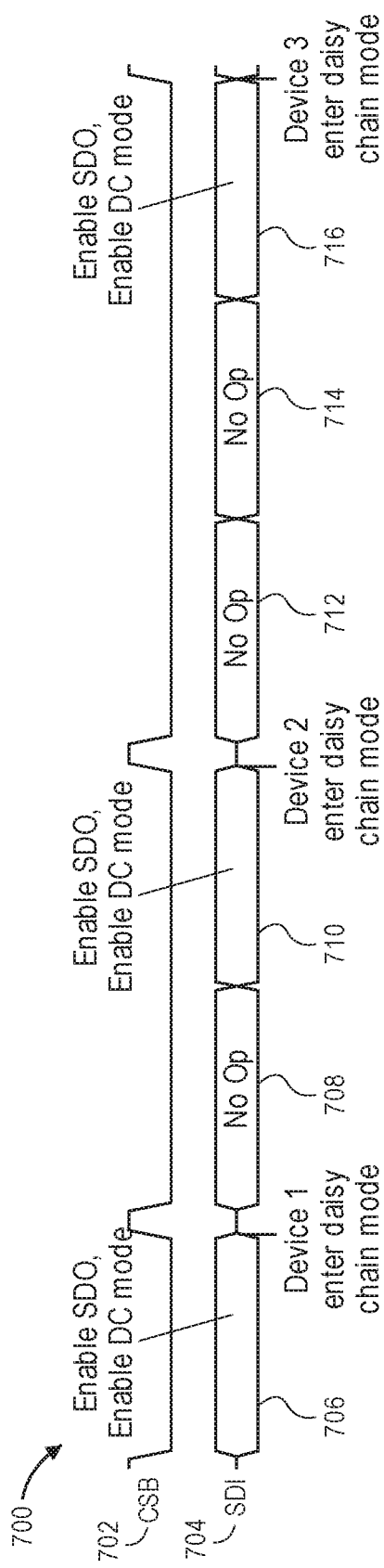
FIG. 7 demonstrates a traditional SPI command to enter/enable daisy chain mode from register addressable mode, in accordance with some embodiments of the disclosure provided herein.

FIG. 7 demonstrates a traditional SPI timeline 700 to enter/enable daisy chain mode from register addressable mode, in accordance with some embodiments of the disclosure provided herein. Some devices have SDO disabled by default. Daisy chain requires the SDO pin to be enabled.

This means that another configuration register needs to be written to enable the SDO. For this scenario and using 3 devices as an example, the SPI frames that need to be sent to the devices are shown in FIG. 7.

Timeline 700 begins with transmission of frame 706 on SDI 704 which enables SDO pin and/or daisy-chain mode of a first SPI device when CSB 702. As the command propagates through the first device, timeline 700 continues with transmission of frame 710 on SDI 704 onto second device, which enables SDO pin and/or daisy-chain mode when CSB 702 is asserted. Frame 708 represents no-op for first device, as host must wait for the entire chain to become enabled.

As the command propagates through the second device, timeline 700 continues with transmission of frame 716 on SDI 704 onto third device, which enables SDO pin and/or daisy-chain mode when CSB 702 is asserted. Frames 712, 714 represent no-op for first and second devices, as host must wait for the entire chain to become enabled. The inventor of the present disclosure note that the required SPI frames that are just for configuration increases as more devices are in the chain. Moreover, enabling the SDO pin and daisy-chain mode both require their own timeline. These are conflated in FIG. 7 for the purpose of brevity.

Figure 8:
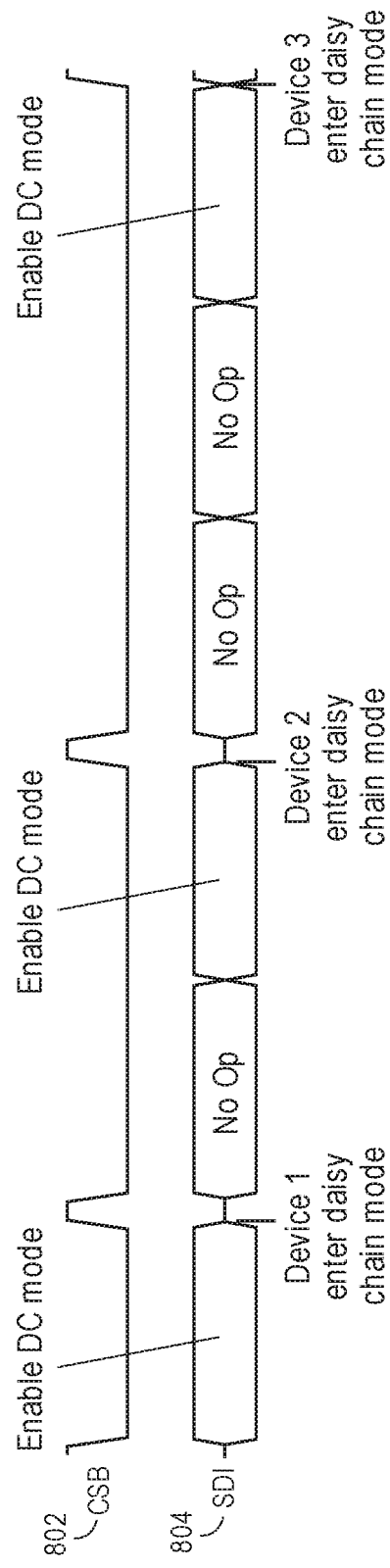
FIG. 8 demonstrates traditional SPI frames to enter/enable daisy chain mode from register addressable mode when SDO is enabled by default, in accordance with some embodiments of the disclosure provided herein.

FIG. 8 demonstrates traditional SPI timeline 800 to enter/enable daisy chain mode from register addressable mode when SDO is enabled by default, in accordance with some embodiments of the disclosure provided herein. It can be appreciated to those in the art that even when the device's SDO pin is enabled by default, entering daisy chain mode would require the SPI frames as shown in FIG. 8. The number of SPI frames saved over transmission via SDI 802 when CSB 802 is asserted is just from the enable SDO command, pursuant to FIG. 7.

Figure 9:
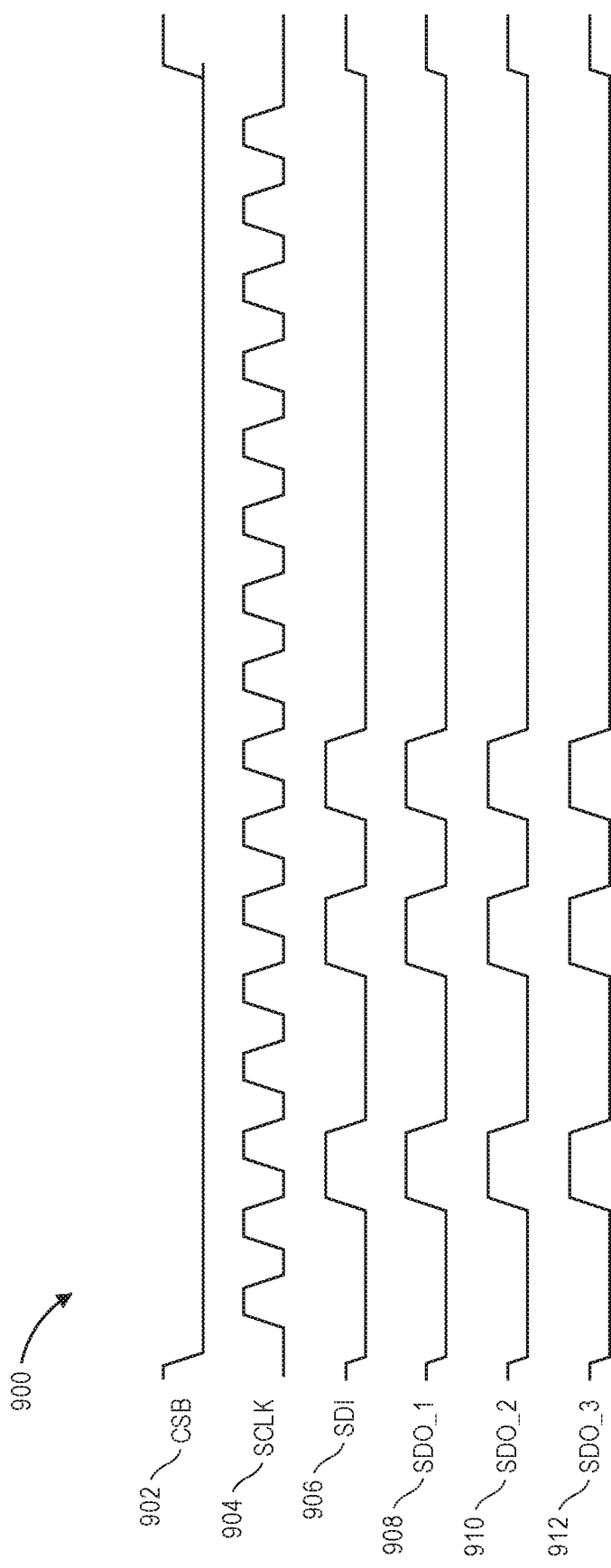
FIG. 9 illustrates an exemplary timing diagram and command structure for entering daisy-chain mode through SDO's default serial output port, in accordance with some embodiments of the disclosure provided herein.

FIG. 9 illustrates an exemplary timing diagram 900 and command structure for entering daisy-chain mode through SDO's default serial output port, in accordance with some embodiments of the disclosure provided herein. FIG. 9 should be viewed in the context of FIG. 5, whereby devices have been configured for daisy-chain use. With the utilization of the SDO of the device, e.g., 514, 516, 518, which is already connected to the SDI of the next device, this present disclosure allows a single SPI frame to simultaneously enable all devices in the chain to daisy chain mode in the following manner.

It is assumed in the present embodiment that the SDO pin has already been enabled or is functional by default. SDOs 514, 516, 518 are designed such that their default output is an enter/enable SPI daisy-chain command frame. An example of this operation is shown in FIG. 9. Host/master's 512 CSB 912 and SCLK 904 are depicted for reference, pursuant to description associated with previous embodiment.

Upon/after any type of reset (power up, hard/soft reset, etc.), host/master 512 sends is an enter/enable SPI daisy-chain command frame over SDI 906. Similarly and simultaneously, SPI device 504 transmits its own enter/enable SPI daisy-chain command frame SDO_1 908 over line 514. It is noted that line 514 connects the output (SDO) of SPI device 504 to input (SDI) of SPI device 506. Also at the same time, SPI device 506 transmits its own enter/enable SPI daisy-chain command frame SDO_2 910 over line 516. It is noted that line 516 connects the output (SDO) of SPI device 506 to input (SDI) of SPI device 508.

Following suit, SPI device 508 transmits its own enter/enable SPI daisy-chain command frame SDO_3 912 over line 518. It is noted that line 518 connects the output (SDO) of SPI device 508 to input (SDI) of SPI device 510. Since each SDO is connected to the SDI of the next device, the enter daisy chain command output at SDO will instruct the next device to enter/enable daisy chain. This is true for all devices in the chain. This happens at the same time that the first SPI instruction is sent to the first device from a host and/or master device.

As discussed SPI can function in multiple modes. Two of them comprise (1) 16-bit register addressable mode and (2) 8-bit FIFO shift-register daisy chain mode. These two modes operate differently and entry/exit between SPI modes can be troublesome. This is very evident when hundreds of SPI devices are connected together forming a large shift register. The previous embodiment disclosed entry into FIFO shift-register daisy chain mode from register addressable mode. Exiting FIFO shift-register daisy chain mode will now be described.

FIG. 10 illustrates an exemplary pattern 1000 of SCLK 1004 and pulsing CSB 1002 to exit daisy chain mode, in accordance with some embodiments of the disclosure provided herein. To exit from daisy-chain mode, a predetermined pattern in CSB 1002 and SCLK 1004 can be detected by an SPI device for it to be able to exit daisy-chain mode. One example pattern 1000 is shown in FIG. 10 where CSB 1002 is pulsed low multiple times and SCLK 1004 is held low. After a defined number of CSB 102 pulses, the device will exit daisy-chain mode, which is demonstrated in the timeline on SPI MODE 1008. It is noted that SDI 1006 can be ignored during this transitional phase.

FIG. 11 illustrates an exemplary pattern 1100 of CSB 1102 and pulsing SCLK 1104 to exit daisy chain mode, in accordance with some embodiments of the disclosure provided herein. Another predetermined pattern is shown in FIG. 11 where the pulses are now at the SCLK 1104 line when CSB 1102 is de-asserted (unasserted) high. After a defined number of SCLK 1104 pulses, the device will exit daisy chain mode, which is demonstrated in the timeline on SPI MODE 1108. It is noted that SDI 1106 can be ignored during this transitional phase. This approach is applicable on systems where the SCLK 1104 line is not shared with multiple CSB 1102 lines.

FIG. 12 depicts the exemplary result/timeline 1200 of exiting daisy chain mode through a dedicated pin, in accordance with some embodiments of the disclosure provided herein. A dedicated reset pin can also be used to exit daisy chain mode. When this pin is toggled, the device will exit daisy chain mode and return to register addressable mode (or to another mode). This is shown in FIG. 12 and an active low or an active high signal can be used. SPI MODE 1206 depicts the present state of an SPI device. When Exit_D-Chain 1202 is asserted, SPI device returns to a predetermined mode. In one or embodiments, its complement Exit_DChain 1204 can also be used to signify and command a transitional mode state.

FIG. 13 depicts the exemplary result/timeline 1300 of exiting daisy chain mode through power cycling, in accordance with some embodiments of the disclosure provided herein. Powering down the device and powering it up again can also reset back the SPI to its default mode which can be register addressable mode. This is shown in FIG. 13 where VSupply 1302 is the power supply connected to the SPI device, and its current state is graphically depicted on SPI MODE 1304.

Figure 14:
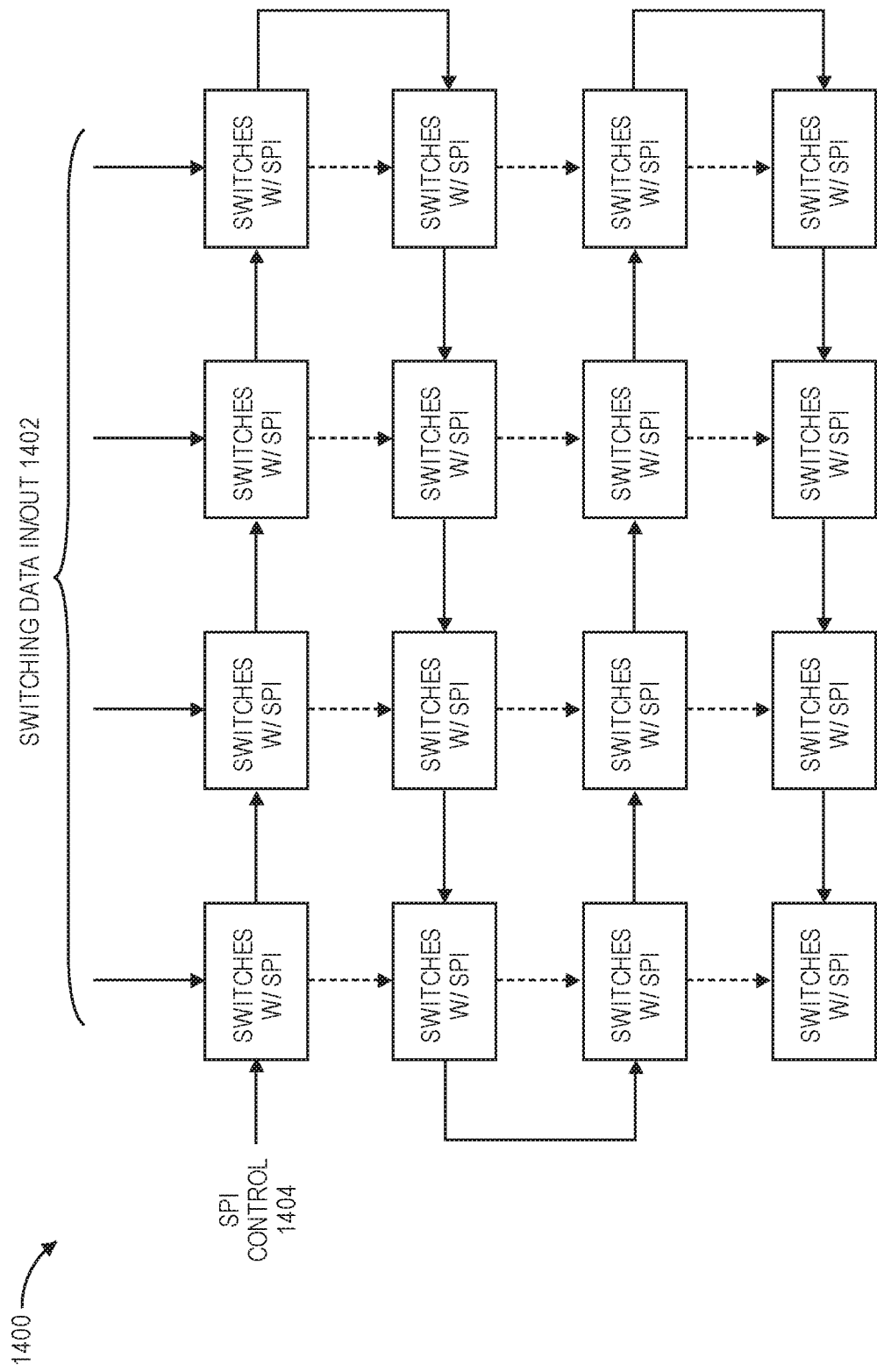
FIG. 14 shows an exemplary daisy chain connected switched matrix, in accordance with some embodiments of the disclosure provided herein; and, FIG. 15 shows an exemplary daisy chain connected switched matrix with an isolation barrier for isolation applications, in accordance with some embodiments of the disclosure provided herein.

FIG. 14 shows an exemplary daisy chain connected switched matrix 1400, in accordance with some embodiments of the disclosure provided herein. The present disclosure may be particularly useful to high density switch matrix applications where an SPI Control 1404 controls an array of SPI devices whose inputs comprise Switching Data In/Out 1402. FIG. 14 has 1402 all directly connected in parallel to their corresponding switches. The present embodiment is particularly useful in automatic test equipment (ATE) based where reducing control lines is an advantage.

Figure 15:
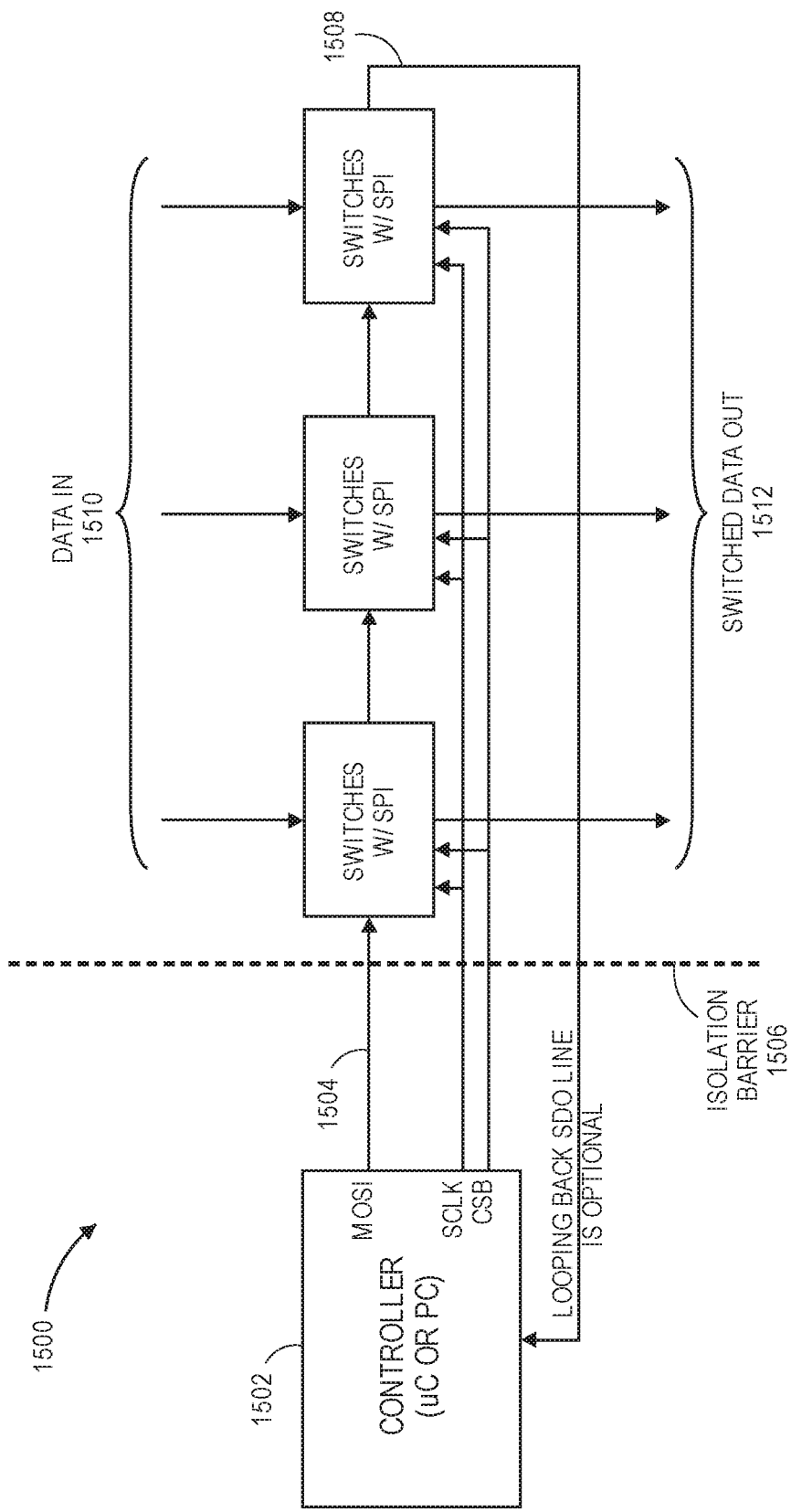

FIG. 15 shows an exemplary daisy chain connected switched matrix 1500 with an isolation barrier 1506 for isolation applications, in accordance with some embodiments of the disclosure provided herein. Host 1502 transmits serial data over MOSI line 1504. A plurality of switches receives both the serial data from MOSI line 1504 and data in 1510. Per instructions comprised by the serial data, switched data out 1512 egresses the plurality. In some embodiments, an SDO line 1508 loops back to host 1502. The present configuration is useful in switching applications which are disposed behind an isolation layer.

For example, Analog Device's ADGS Switch will service a need in isolated systems to work with iCoupler devices or isolated ADC's. Currently to use a switch up past the isolation barrier, GPOs are necessary or bringing extra lines up through the isolation barrier. Another advantage is reducing the number of clock cycles to configure devices beyond the isolation barrier.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. An apparatus for entering daisy-chain mode in an SPI device comprising:
    an input to receive serial data;
    a clock pin to receive a temporal signal;
    a select pin; and,
    a serial output whose default instruction is a signal to enable daisy chain mode within 16 clock cycles, which is implemented at startup;
    wherein, the SPI device is configured to change between daisy chain mode and a register addressable mode in response to the assertion of the select pin.

2. The apparatus of claim 1, wherein the default instruction is an SPI frame.

3. The apparatus of claim 2, wherein the SPI frame comprises a command field, an address field, and data field.

4. The apparatus of claim 2, wherein the SPI frame is 8-bits in length.

5. The apparatus of claim 1, whereby the default instruction is automatically sent after a hard reset.

6. The apparatus of claim 3, wherein said default instruction is a predetermined combination of the command field and address field.

7. The apparatus of claim 2, wherein the SPI frame is hexadecimal 0Andreas500.

8. The apparatus of claim 1, whereby the SPI device exits daisy chain mode by concurrently receiving a predetermined pattern by the clock pin and predetermined pulses by the select pin.

9. The apparatus of claim 1, whereby the SPI device exits daisy chain mode by concurrently receiving a predetermined pattern by the select pin and predetermined pulses by the clock pin.

10. The apparatus of claim 1, further comprising a pin wherein the SPI device exits daisy chain mode by receiving a binary signal thereover.

11. The apparatus of claim 1, whereby the SPI device exits daisy chain mode by power cycling.

12. A system for entering daisy-chain mode comprising:
    an SPI master device; and,
    a plurality of SPI slave devices concatenated in a daisy chain configuration, each SPI slave device comprises:
    an input to receive serial data;
    a clock pin to receive a temporal signal;
    a select pin; and,
    a serial output whose default instruction is a signal to enable daisy chain mode within 16 clock cycles, which is implemented at startup;
    wherein, the SPI device is configured to change between daisy chain mode and a register addressable mode in response to concurrently receiving a predetermined pattern on the clock pin and predetermined pulses on the select pin.

13. The system of claim 12, wherein the default instruction is an SPI frame.

14. The system of claim 13, wherein the SPI frame comprises a command field, an address field, and data field.

15. The system of claim 12, wherein the SPI frame is 8-bits in length.

16. The system of claim 12, whereby the default instruction is automatically sent after a hard reset.

17. The system of claim 14, wherein said default instruction is a predetermined combination of the command field and address field.

18. The system of claim 13, wherein the SPI frame is hexadecimal 0Andreas500.

19. An apparatus for entering daisy-chain mode in an SPI device comprising:
    a means for receiving serial data;
    a means for receiving a clock signal;
    a means for receiving a select signal; and,
    a means for transmitting serial output, wherein the default transmission is a signal to enable daisy chain mode within 16 clock cycles which is implemented at startup;
    wherein, the SPI device is configured to change between daisy chain mode and a register addressable mode in response to the assertion of the means for receiving a select signal.

20. A system for entering daisy-chain mode in a plurality of serial peripheral devices within a single serial frame and dynamically change the plurality of Serial Peripheral Devices (SPD) from register addressable mode to daisy-chain mode in a single serial frame, the system comprising:
    a plurality of serial peripheral devices comprising a select pin and serial device output (SDO) in a daisy chain configuration, wherein the plurality of serial peripheral devices initializes into register addressable mode after any powerup;

wherein, the serial device output default instruction is a signal to enable daisy chain mode within 16 clock cycles which is outputted to the next serial peripheral device in the system;

whereby, the serial device output default instruction is automatically clocked to the next device in the chain on the first single serial frame, after the select pin is asserted.

21. The system of claim 20, wherein the plurality of serial peripheral devices further comprises clock pin to a receive temporal signal.

22. The system of claim 21, wherein the serial device output default instruction is an SPI frame comprising 16 or fewer clock cycles pursuant to the clock pin.

23. The apparatus of claim 20, wherein the SPI single serial frame further comprises a command field, an address field, and data field.

24. The system of claim 20, whereby the serial device output default instruction is a signal is automatically sent after a hard reset.

* * * * *